United States Patent
Bhangu et al.

(10) Patent No.: US 11,473,681 B2
(45) Date of Patent: Oct. 18, 2022

(54) GLOBE VALVE FOR CONTROLLING A PROCESS FLUID FLOW

(71) Applicant: FOCUS-ON V.O.F., Zwijndrecht (NL)

(72) Inventors: Kavreet Bhangu, Bruckmuehl (DE); Andre H. Boer, Sliedrecht (NL); Jonas Waid, Darmstadt (DE); Michael Merscher, Roedermark (DE); Marcel Krueger, Schoeneck (DE)

(73) Assignee: Focus-On V.O.F., Dordrecht (NL)

( * ) Notice: Subject to any disclaimer, the term of this patent is extended or adjusted under 35 U.S.C. 154(b) by 209 days.

(21) Appl. No.: 16/894,809

(22) Filed: Jun. 7, 2020

(65) Prior Publication Data

US 2020/0386321 A1   Dec. 10, 2020

(30) Foreign Application Priority Data

Jun. 7, 2019  (EP) ...................................... 19179080

(51) Int. Cl.
  *F16K 1/08* (2006.01)
  *F16K 1/36* (2006.01)
  (Continued)

(52) U.S. Cl.
  CPC .................. *F16K 1/08* (2013.01); *F16K 1/36* (2013.01); *F16K 47/08* (2013.01); *F16K 1/42* (2013.01)

(58) Field of Classification Search
  CPC ..... F16K 1/08; F16K 1/36; F16K 1/42; F16K 27/02; F16K 47/023; F16K 47/08;
  (Continued)

(56) References Cited

U.S. PATENT DOCUMENTS 3,506,242 A * 4/1970 Aunspach ............... F16K 27/02
251/361
3,648,718 A   3/1972 Curran
(Continued)

FOREIGN PATENT DOCUMENTS

| EP | 2890919 B1 | 1/2017 |
| FI | 20049 A | 4/1944 |
| FR | 330827 A | 8/1938 |

OTHER PUBLICATIONS

European Search Report dated Nov. 14, 2019, for Application No. 19179080.7.

*Primary Examiner* — Craig J Price
*Assistant Examiner* — Andrew J Rost
(74) *Attorney, Agent, or Firm* — Banner & Witcoff Ltd.

(57) ABSTRACT

A globe valve (e.g. Flow-To-Open valve) can include an inlet opening with a circular shaped opening cross section defining a valve axis, a globe valve member movable in a vertical direction transversely to the valve axis and connectable, via a valve rod, to an actuator for actuating the globe valve member, and a passage opening with a circular-shaped passage opening cross section. The globe valve member closes the passage opening at a lowest actuating position, in the vertical direction, and a flow channel extending from the inlet opening to the passage opening defines a flow cross section. The surface size of the flow cross section decreases in a first section from the inlet opening, in a flow direction, to a transition point. The flow cross section, in the first section, is continuously oval shaped and the first section of the flow channel is continuously inclined downwards in the vertical direction.

18 Claims, 3 Drawing Sheets

(51) Int. Cl.
*F16K 47/08* (2006.01)
*F16K 1/42* (2006.01)

(58) Field of Classification Search
CPC ..... F16K 1/32; F16K 1/06; F16K 1/54; F15D 1/06; F01D 17/145; F01D 17/18; F05D 2220/31; F05D 2250/71; Y10T 137/87877; Y10T 137/87121; Y10T 137/87917
USPC ................................ 138/43, 45, 46; 251/205
See application file for complete search history.

(56) References Cited

U.S. PATENT DOCUMENTS

| | | | |
|---|---|---|---|
| 5,540,415 A | 7/1996 | Yamamoto et al. | |
| 5,765,814 A * | 6/1998 | Dvorak | F16K 47/04 251/118 |
| 6,935,371 B2 * | 8/2005 | Stares | F16K 3/24 137/625.37 |
| 9,518,662 B2 * | 12/2016 | Doran | F16K 1/32 |
| 9,790,805 B2 * | 10/2017 | Takemaru | F01D 17/18 |
| 2013/0320252 A1 * | 12/2013 | Hageman | F16K 47/08 251/324 |
| 2014/0061527 A1 * | 3/2014 | Hilsabeck | F16K 47/08 251/356 |
| 2014/0346384 A1 * | 11/2014 | Roper | F16K 1/52 251/205 |

\* cited by examiner

GLOBE VALVE FOR CONTROLLING A PROCESS FLUID FLOW

CROSS REFERENCE TO RELATED APPLICATIONS

This patent application claims priority to European Patent Application No. 19179080.7, filed Jun. 7, 2019, which is incorporated herein by reference in its entirety.

BACKGROUND

Field

The disclosure relates to a valve for controlling a process fluid flow of a process engineering plant, such as a chemical plant, for instance a petrochemical plant, a power plant, a food processing plant or the like.

Related Art

Figure 7:
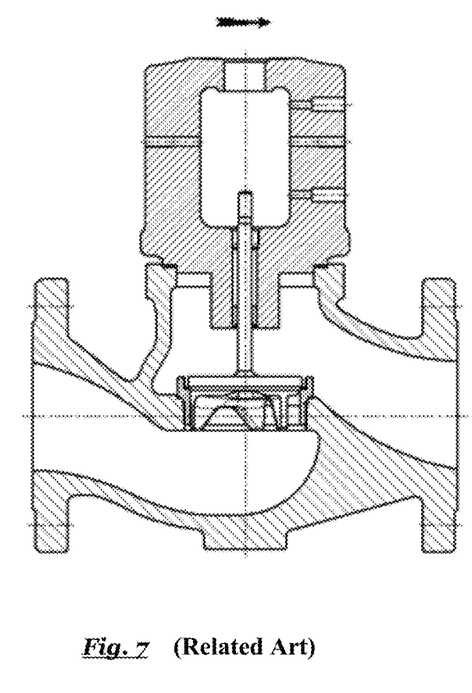
FIG. 7 illustrates a conventional globe valve.

A conventional globe valve is shown in FIG. 7. Globe valves usually have a cylinder tube like inlet and a cylinder tube like outlet being arranged coaxially to a common valve axis. A globe valve has a passage in between its inlet and its outlet which is arranged orthogonal to the valve axis. This passage can be closed by means of a movable globe valve member. The globe valve member is usually articulated directly or indirectly to an actuator for actuating the valve member by means of a valve rod, wherein the valve rod extends perpendicular to the valve axis through an access opening of the valve housing into an outside area in which the actuator is located. The access opening can be closed in a process fluid tight manner by means of a cover, a lantern or a housing section of the actuator. The valve member can generally be referred to as a valve cone. Globe valves can be subdivided into so-called Flow-To-Open (FTO) and Flow-To-Close (FTC) valves. Flow-To-Open valves are designed for an operational use of a predetermined flow direction of the process fluid corresponding to the opening direction of the valve member. Flow-To-Close valves are designed for an operational use with a process fluid flow direction corresponding to the closing direction of the valve. For the use and a correct installation, a predetermined operational flowing direction is usually noted with a clearly visible marking on the outside of the valve. The inlet and outlet geometry of valves is characterised by the valve member orientated perpendicularly to the middle axis of the valve which can be for instance a valve cone, a valve piston in connection with a valve cage or another throttle element. The inlet usually describes first a curved bow extending in vertical direction downwards to below the passage opening and then upwards in the direction of the passage opening. The outlet describes a curved bow arching from the passage opening upwards and subsequently downwards. The construction length of common globe valves is normed so that only a limited, defined construction space is available for the deflection of the flow. Due to the multiple deflection of the process flow between the inlet and the outlet, an additional flow resistance arises.

In order to counteract an increase of the flow resistance caused by the curved area in the inlet and by the friction losses at the tube wall, it is usual to enlarge the inlet cross section continuously up to the throttle element. In this way, a reduction of the flow through factor (Kv-value) caused by an increased resistance shall be contacted. This is for instance described in U.S. Pat. No. 3,648,718. In the diagram (FIG. 6), and exemplary course of the cross section surfaces of the flow channel from the inlet to the passage is illustrated. It has been found that the process fluid flow separates after about ⅔ of the way to the passage opening. The separation can take place earlier or later depending on the flow velocity and the pressure difference. The undefined separation of the flow from the channel wall of the inlet leads to the formation of swirls and can be the reason for high flow losses. Due to the formation of swirls and reverse flows in the inlet channel, undefined and changing flow resistances are created. Thereby, the inlet pressure directly in front of the passage which can be closed by the valve member (this area can also be designated as throttle point) can substantially differ from an assumed pressure. This can have the consequence that a subsequent pressure reduction downstream the passage opening does not reach and desired outlet pressure or outlet flow through.

EP 2 890 919 B1 describes a globe above which comprises a knee pipe section from the inlet to the passage, wherein the knee pipe section has a circular shaped cross-section and wherein it's pipe diameter is smaller in a straight, cylindrical pipe section compared to the diameter of the passage opening. The diameter of the cross section shall thereby gradually decrease from the diameter at the inlet to the pipe diameter at the passage. The described pipe geometry shall lead to a reduction of turbulent swirl flows in particular below the passage opening. However, also with the valves described in EP 2 890 919 B1 turbulent flows arise in sections which creates undesired resistances and causes noises. Further, such a valve needs a relatively large construction space.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The exemplary embodiments of the present disclosure will be described with reference to the accompanying drawings. Elements, features and components that are identical, functionally identical and have the same effect are—insofar as is not stated otherwise—respectively provided with the same reference character. The designation of directions "vertical", "horizontal" and "transverse" have to be understood in relation to each other, wherein the designated directions mutually extend perpendicular to each other. The cuts are parallel to the plane Q V or are inclined to this plane.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

It is an object of the disclosure to overcome drawbacks of the prior art, in particular to provide a valve which reliably avoids reverse flow and/or formation of swirls in the inlet area, in particular without impairing the Kv value of the valve, and which does not require an increase of the construction space.

In one or more exemplary embodiments, a globe valve for controlling a process fluid flow of a process engineering plant comprises an inlet opening, a globe valve member, a passage opening and a flow channel which extends from the inlet opening to the passage opening and defines a flow cross section. In an open valve state, the process fluid can flow in a flow direction through the globe valve. The inlet opening has a circular shaped opening cross section and defines a valve axis. The valve axis can correspond to a horizontal direction. The globe valve is movable in a vertical direction transversely, in particular perpendicularly, to the valve axis. By means of a valve rod located in vertical direction above the valve member, the globe valve member can be connected with an actuator for actuating the globe valve member. The passage opening has a circular shaped passage opening cross section. This initial passage opening cross section can be cylindrically shaped along an inlet area after which the curved flow channel begins. The valve member can also be arranged eccentrically so that the inlet area is formed longer. In particular in this case, enough construction space is present for the initially cylindrical circular shaped section.

In an in vertical direction lowest actuating position (or: close position), the global valve member closes the passage opening. When the valve member is arranged in the lowest actuating position, the valve is in a closed state. For opening the valve, the valve member can move in vertical direction upwards and take an actuating position above the close position. The flow channel fluidly connects the passage opening with the inlet opening. The flow cross section of the flow channel can extend along a cutting plane orthogonal to a flow centre point line of the flow channel and/or orthogonal to the valve axis.

In an exemplary embodiment, the surface size of the flow cross section decreases in a first section from the inlet opening in a flow direction to a transition point. The surface size of the opening cross section of the inlet opening can define the largest possible surface size of the flow channel. In an exemplary embodiment, each flow cross section located in flow direction behind the opening cross section can have a lower surface size than the opening cross section. In particular, the surface size of the flow channel in the first section continuously decreases in flow direction. In an exemplary embodiment, the flow cross section is continuously oval-shaped at least in the first section. An "oval" shape can be any cross-section shape, in particular any convex, rounded and/or curved cross section shape, deviating from a rotationally symmetric circular shape, such as an egg shape, an ellipse shape or a rounded polygon. The circumference shape of an oval cross-section consists of circular arcs, in particular circular arcs of different curvature, and/or of straight lines merging into each other. The transition between adjoining circular arcs and/or straight lines is stepless. In an exemplary embodiment, the oval form of the flow cross section is at least in sections, in particular always, mirror symmetrical to a mirror plane extending in vertical direction and horizontal direction.

In an exemplary embodiment, the first section of the flow channel is, in the vertical direction, continuously inclined downwards. The inclination can relate to the lower subarea (the ground) of the flow channel and/or the upper subarea (the roof) of the flow channel.

A second section of the flow channel extends in flow direction after a transition point up to the passage opening. In the second section, in particular vertically below the passage opening, the surface size of the flow channel can substantially remain the same. Substantially remaining the same can mean that the flow cross section within the, in particular the entire, second section changes less than ±5%, in particular with regard to the surface size of the opening cross section. According to an embodiment, the surface size of the flow cross section in the second section can at least remain the same or, particularly continuously, increase. The flow cross section can be oval shaped in particular exclusively in the first section up to the transition point. Alternatively, the flow cross section in the first section and in the second section can be oval formed.

In an exemplary embodiment, within the first section, the height of the flow channel in vertical direction continuously decreases in the course of the flow channel in flow direction and the width of the flow channel in a transverse direction transverse to the vertical direction and to the vertical axis continuously increases. In an exemplary embodiment, the height of the flow channel continuously decreases. In an exemplary embodiment, the width of the flow channel continuously decreases. According to an alternative, the width of the flow channel in an inlet area adjoining the inlet opening can be constant, wherein the width of the flow channel after the inlet opening continuously, in particular steadily, increases. A continuous increase describes a course along which a proportion, such as a width or a height, which continuously increases, always either remains the same or increases. A continuous decreasing proportion either remains the same or always decreases along a continuous course. In an exemplary embodiment, the height reduction is larger than the width increase, more or less in such a way that an oval surface being defined by the width and the height in total decreases its surface size.

In an exemplary embodiment, the width of the flow channel increases in the second section in the course of the flow channel in flow direction up to a maximal width. The maximal width can be arranged in the area of the passage opening. The maximal width can cross the middle point line of the passage opening.

In an exemplary embodiment, a ratio of the diameter of the inlet opening relative to the maximal width of the flow channel can be at least 0.75±0, 05. The course of the width of the flow channel from the inlet opening to the maximal width can be defined by a widening angle. The widening angle can in particular be smaller than 15°, preferably 10°±3°. The present disclosure is not limited to these exemplary dimensions and angles, and can be other dimensions and angles as would be understood by one of ordinary skill in the art.

In an exemplary embodiment, the flow cross section comprises in the first section a decrease of the surface size relative to the surface size of the opening cross section of at least 10% and/or of maximally 30%. In an exemplary embodiment, the flow cross section can comprise in the first section a decrease of the surface size of 20%. In an exemplary embodiment, the flow cross section of the flow channel comprises along its entire course from the inlet opening to the passage opening a decrease of the surface size relative to the surface size of the opening cross section at the inlet opening of not more than 30%, preferably not more than 25%, more preferably not more than 20%.

In an exemplary embodiment, the flow channel can comprise an in vertical direction lowest vertex which is in horizontal direction arranged offset from a straight line in vertical direction through the middle point of the passage opening. The lowest vertex of the flow channel can be the lowest vertex of a, with regard to the valve axis, convex flow channel arching. In particular, the vertex is located at an in horizontal direction front end of the passage opening or in horizontal direction between the front end of the passage opening and the straight-line.

In an exemplary embodiment, a ratio of a diameter of the inlet opening relative to a vertical height of the flow channel at the transition point can be at least 1.55±0.10. Alternatively or additionally, a ratio of a diameter of the inlet opening relative to a vertical height of the flow channel at the vertex can be at least 1.55±0.10.

In an exemplary embodiment, the flow channel has an in vertical direction upper subarea which, in the course of the flow channel in flow direction in the first section, comprises a decreasing surface size. In particular, the decrease of the surface size in the upper subarea of the flow channel can determine the entire decrease of the surface size of the flow channel in the first section. The decrease of the surface size can in particular be defined relative to the surface size at the inlet opening of the global valve.

In an exemplary embodiment, the flow cross section within the first section is at least in sections partial circular shaped. In the first section of the course of the flow channel in flow direction, a partial circular curvature of the flow cross section flattens at least in sections within the upper subarea. The curvature describes in the meaning of this application the shape of the wall of the flow channel in a cross sectional surface orthogonal to the valve axis and/or orthogonal to a flow middle point line.

In an exemplary embodiment, the flow cross section at the transition point in the upper subarea of the flow channel is concave. Along the course of the first section of the flow channel, the upper subarea can be entirely or at least predominantly (along at least 75%, in particular at least 90%, of the length of the first section) convexly curved. In the second section of the flow channel, the flow channel can at least in sections in the upper subarea define a flat, in particular plane horizontal, flow cross section subarea.

In flow direction behind the transition point, the upper subarea of the flow channel can extend horizontally in the second section. In particular, the upper subarea of the flow channel extends behind the transition point in a plane extending in horizontal direction and in transverse direction.

In an exemplary embodiment, the flow channel has an in vertical direction lower subarea which is continuously half circular shaped in the course of the flow channel in flow direction. Between the upper subarea and the lower subarea, a rounded, radius like transition area can be provided. The half circular shaped lower subarea (half-circle section) can extend along a bow angle between 180°±40°, in particular 180°±20°, preferably 180°±10°. The curvature of the lower half cycle section can be continuously, in particular constant, along the bow-shaped flow course. The curvature radius of the half circle section can substantially corresponds to the channel radius, i.e. the half of the channel width. It is possible that the curvature of the lower subarea increases in the course in flow direction. The partial circle area can consists of several radii tangentially adjoining each other. Thereby, an elliptical partial circular form can be created. The present disclosure is not limited to these exemplary dimensions and angles, and can be other dimensions and angles as would be understood by one of ordinary skill in the art.

In an exemplary embodiment, the first section of the flow channel comprises a lower inclination angle of about 25° or less. The upper subarea and the lower subarea can comprise an inclination extending in vertical direction downwards along the entire extension within the first section of the flow channel. In an exemplary embodiment, within the first section in flow direction, the flow channel has a stronger inclination in its upper subarea than in its lower subarea. This inclination of the upper subarea can in particular be 45°±10°. The inclination of the lower subarea can preferably be between 20° and 30°. In particular, the lower inclination angle can be smaller than 25°, such as 20°±3°. The inclination angle can in particular be determined within a cross section plane which extends in vertical direction and in horizontal direction. Compared to ordinary valves, the inclination of the flow channel, in particular of the lower subarea, is noticeably decreased. By this way, it can be assured that the process fluid is subjected to a relative low deflection along the flow course from the inlet opening to the passage opening. Thanks to the reduced inclination, the friction of the process fluid flow can be reduced. Further, a reduced inclination can cause that flow separation from the channel wall can be avoided. Within the plane, in which the inclination is defined, an arching of the channel can be defined too. In general, the flow channel of an ordinary global valve first arches in vertical direction downwards so as to subsequently arch in vertical direction upwards to the passage opening. The inclination angle can be defined at a turning point of the arching. The upper inclination angle can be defined at a cutting point of the upper subarea and the valve axis. The present disclosure is not limited to these exemplary dimensions and angles, and can be other dimensions and angles as would be understood by one of ordinary skill in the art.

Using the globe valve as a Flow-To-Open valve according to exemplary embodiments advantageously realizes that the valve member, in particular the valve piston, and a valve rod do practically have no influence on the flow behaviour within the measuring area, preferably in the second section of the flow channel, because the valve member and the valve rod are located in flow direction downstream the measuring area. Further, a Flow-To-Open valve according to exemplary embodiments advantageously provides that the opening movement and respectively the closing movement of the valve member happens within the outlet area. In this way, a precise measurement, for instance a flow through measurement, in the measuring area, in particular in the first section, can be assured.

A globe valve according to exemplary embodiments is generally designated with the reference sign 1.

Figure 1:
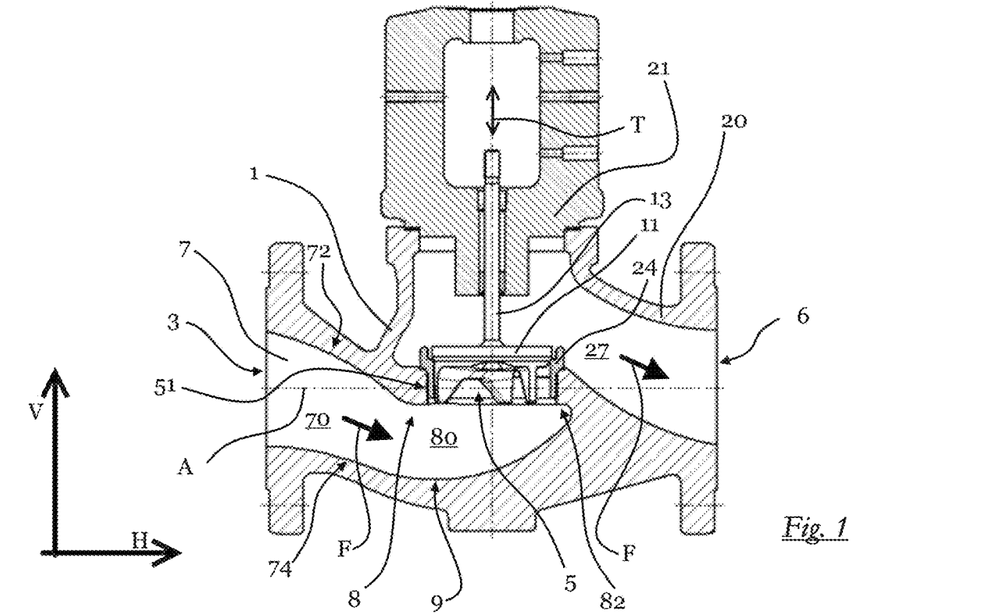
FIG. 1 illustrates a cross-sectional view of a globe valve according to an exemplary embodiment.

In an exemplary embodiment, the globe valve 1 comprises a circular shaped inlet opening 3, a circular shaped passage opening 5 and a flow channel 7 which extends from the inlet opening 3 to the passage opening 5. Further, the globe valve 1 comprises an outlet opening 6. The circular shaped inlet opening 3 and the outlet opening 6 are located coaxially to each other on a common valve axis A. The valve axis A extends through the circle middle point of the inlet opening 3. The outlet opening 6 can also be circular shaped.

In an exemplary embodiment, the globe valve 1 comprises a valve housing 2. The housing 2 can comprise normed pipe flange adapters at the inlet opening 3 and at the outlet opening 6. The passage opening 7 which comprises a closable valve member 11 is located in the middle of the valve housing 2 and in flow direction F between the inlet opening 3 and the outlet opening 6. The arrangement of the valve member can also be realised eccentrically so that the inlet area is formed longer. The circular shaped passage opening 5 can be formed by means of a through bore in the valve housing 2. At the passage opening 5, the valve 1 can be designed with a ring-shaped valve seat 24 which occupies the passage opening 5 and defines a close- and/or opening recess with the valve member 11. It shall be clear that with another inventive embodiment, which is not further shown, alternatively or additionally, for instance a hollow cylindrical valve cage and optionally a piston like cage valve member can be provided. It is possible that the valve member 11 has a different shape than the one shown in the figures, such as a cone shape or a partial spherical shape.

For its actuation, the valve member 11 is connected with a valve rod 13. The valve rod 13 extends in the vertical direction V out of the housing 2. For mounting the valve seat 24 as well as for inserting the valve rod 13 and the valve member 11, the housing 2 can comprise a detachably sealing mountable cover 21. The cover 21 can, as illustrated, be designed in functional union with a dynamic sealing for sealingly guiding the valve rod 13 out of the fluid carrying inner section of the valve 1 and/or with a lantern, located in the vertical direction V above the same, for attaching a setting actuator, such as a pneumatic or electric setting actuator (not further shown), for actuating the valve member 11.

In the operational position shown in FIG. 1, the valve member 11 is in a close position in which the valve member 11 is located in a sealingly closing contact with the valve seat 24. The valve member 11 can be seated transversely movable T in vertical direction T by means of the valve rod 13. A movement of the valve member 11 in vertical direction V upwards can be designated as opening movement. A movement of the valve member 11 in vertical direction B downwards can be designated as closing movement.

The inlet opening 3 and the outlet opening 6 can be arranged plan parallel to each other. In an exemplary embodiment, the inlet opening 3 and/or the outlet opening 6 extend in a plane extending in vertical direction V and in transverse direction Q orthogonal to a horizontal direction H. In an exemplary embodiment, the passage opening 5 extends in a horizontal plane which extends in horizontal direction H and transverse direction Q orthogonal to the vertical direction V. For opening and closing the globe valve 1, the valve member 11 is movable in the vertical direction V downwards and upwards.

The flow direction F extends in the inventive globe valve 1 from the inlet opening 3 through the passage opening 5 to the outlet opening 7. In the sealed status illustrated in FIG. 1, the valve member 11 sealingly closes the passage opening 5 so that, practically, no process fluid volume flow can move from the inlet 13 to the outlet 6. As soon as the valve member 11 leaves the ceiling closing position according to FIG. 1, a volume flow of the process fluid can flow from the inlet opening 3 of the flow channel 7 to the passage opening 5, through the passage opening 5 and from the passage opening 5 along an outlet channel 27 in flow direction F to the outlet opening 6. The opening movement of the valve member 11 takes place in the outlet channel 27.

With the globe valve 1 according to exemplary embodiments, the flow direction F of the process fluid is predetermined in that, in an open valve state, the flow direction F around the valve member 11 and/or through the inlet opening 5 corresponds to the direction of the opening movement of the valve member 11. In one or more exemplary embodiment, the globe valve 1 can insofar be designated as Flow-To-Open globe valve. The skilled person understands that the predetermined flow direction defines a distinct mounting of the inventive globe valve 1 in a process engineering plant from which it shall not be deviated because otherwise the prescribed proper function of the inventive globe valve is not provided.

In an exemplary embodiment, the globe valve, in form of a measuring valve, in particular a flow measuring valve, is integrated into a process engineering plant for precisely determining process fluid measurement parameters, such as a process fluid volume flow, a process fluid flow velocity and/or a process fluid pressure. For this purpose, one precision sensor or multiple precision sensors for determining the process fluid measurement parameter(s) (not further shown) can be provided in a section 70, 80 of the flow channel 7, in particular below the passage opening 5. Precision measurement tools require controlled, as far as possible constant environmental conditions. For instance, an ultrasonic sensor can be used as precision sensor. The Flow-To-Open globe valve 1 according to an exemplary embodiment advantageously ensures that constant environmental conditions are present within the flow channel 7 and in particular in its inlet section 70 which enable the implementation of precision measurement devices. As a consequence of the inventive construction, it can be advantageously ensured that the entire flow channel, in particular the inlet section 70 and/or the section 80 below the passage opening 50, is free or at least almost free of process fluid swirls and/or flow separation.

In the globe valve 1 according to an exemplary embodiment, the flow channel 7 has an oval cross-sectional shape. Each roundish cross-sectional shape deviating from a circular shape can be designated as oval. It can be characteristic for the oval cross-sectional shape of the flow channel 7 that it is put together from a lower subarea 74 with a first characteristic bow shaped, continuous curvature, and a second, upper subarea 72 with a second characteristic bow shaped, continuous curvature. The second curvature of the upper subarea 72 can continuously flatten within the course in flow direction F. The first curvature of the lower subarea 74 can increase or decrease within the course of the flow channel 7 in flow direction F. The curvature radius of the lower subarea is always larger than the one of the upper subarea 72.

Between the lower subarea 74 and the upper subarea 72, rounded transition areas 73 can be provided. The channel width or width b of the flow channel can be determined by the largest distance between the transition areas 73 diametrically opposing each other in transverse direction Q between the upper subarea 72 or roof and the lower subarea 74 or ground of the flow channel 7.

The channel height h can be determined by the distance between the curvature vertexes of the upper subarea 72 and the lower subarea 74. In an exemplary embodiment, a ratio d3/h8 of a diameter d3 of the inlet opening 3 relative to a vertical height h of the flow channel 7 at the transition point is for instance about 1.54. In an exemplary embodiment, a ratio d3/h9 of a diameter d3 of the inlet opening 3 relative to a vertical height h of the flow channel 7 at the vertexes 9 is for instance about 1.55 or more.

Figure 2:
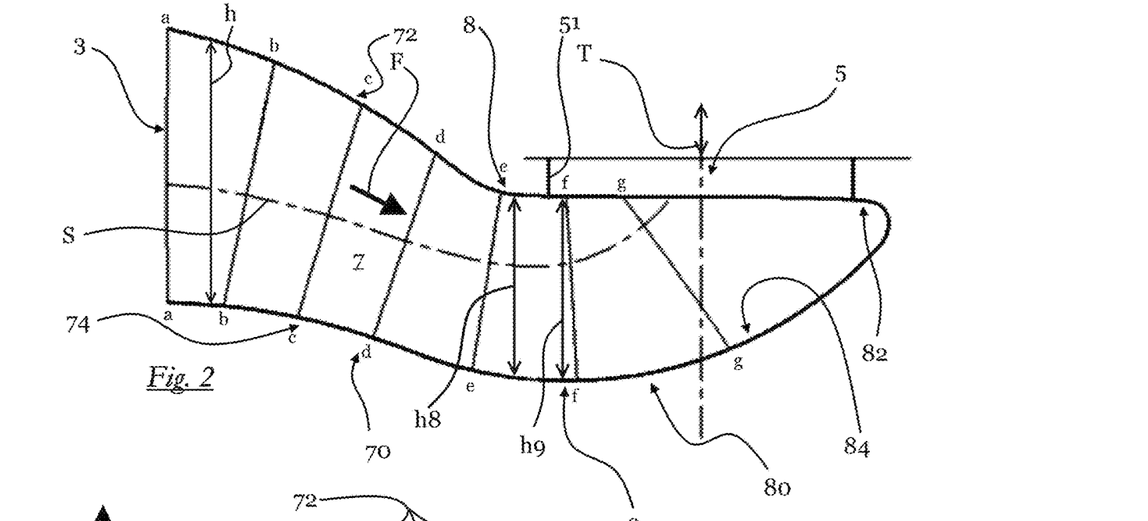
FIG. 2 illustrates a detailed view of the flow channel of the globe valve according to FIG. 1.
Figures 3A, 3B:
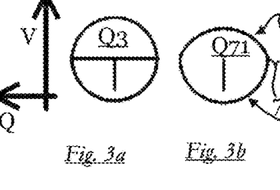
FIG. 3a illustrates a cross-sectional view of the circular shaped opening cross section at the inlet of the globe valve along the cutting line a-a according to FIG. 2.
FIG. 3b illustrates a cross-sectional view of the flow channel along the cutting line b-b according to FIG. 2.
Figure 3C:
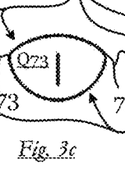
FIG. 3c illustrates a cross-sectional view along the cutting line c-c according to FIG. 2.
Figures 3D, 3E:
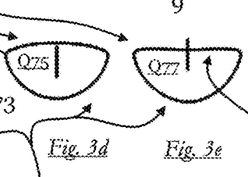
FIG. 3d illustrates a cross-sectional view along the cutting line d-d according to FIG. 2.
FIG. 3e illustrates a cross-sectional view along the cutting line e-e according to FIG. 2.
Figure 3F:
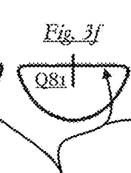
FIG. 3f illustrates a cross-sectional view along the cutting line f-f according to FIG. 2.
Figure 3G:
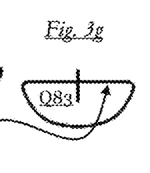
FIG. 3g illustrates a cross-sectional view along the cutting line g-g according to FIG. 2.

Within the illustration of the flow channel 7 according to FIG. 2, the flow direction 11 extends from the left to the right. In flow direction F, the process fluid successively flows through the cross-sectional surfaces a-a, b-b, c-c, d-d, e-e, f-f and g-g. Subsequently, the process fluid flows through the passage opening 5 to the outlet channel 27.

The "curvature" of the lower part 74 and of the upper part 72 of the flow channel 7 designates the curvature in the respective cross-sectional plane, as can be seen in the FIGS. 3b to 3e. The lower subarea 74 of the flow channel 7 continuously has a substantially half circle shaped cross-section D within the cross sections. This means that the curvature radius of the lower subarea 74 corresponds substantially to the half of the channel width b. In an exemplary embodiment, a deviation of the curvature radius from the half of the channel width in the lower subarea 74 of the flow channel 7 is ±50%.

In an exemplary embodiment, in the upper subarea 72 of the flow channel 70, the curvature continuously decreases within the course of the flow channel 7 in flow direction F. The cross-sectional surface of the upper subarea 72 of the flow channel 7 is already shortly behind the opening cross section Q3, namely in the cross-sectional plane b-b of the opening cross section Q71 in the upper subarea 72, only about the half of the upper half of the cross-sectional surface Q3 of the opening cross section. Somewhat further channel downwards, the upper part 72 of the cross-sectional surface Q73 is only about the half of the upper part 72 of the previous cross-sectional surface Q71. Further downstream, the upper part 72 in the flow cross-section Q75 is again reduced to about the half compared to the previous cross-sectional surface Q73. The reduction of the upper part 72 of the cross-sectional surface Q71, Q73, Q75 of the flow channel 7 substantially represents the reduction of the entire cross-sectional surface of the flow channel 7. The width b of the cross-sectional surface Q71, Q73, Q75 within the first section 70 increases, however in a small amount compared to the decrease of the height of the upper part 72, so that, in total, the cross-sectional surface Q71, Q73, Q75 decreases in the course of the flow channel 7.

The cross-sectional surfaces Q81 and Q83 can overall be substantially half circular shaped within the second section 80. In an exemplary embodiment, the cross-sectional surfaces Q81, Q83 in the second section 80 substantially comprise the same surface size±5%.

In an exemplary embodiment, within the first section 70 of the flow channel 7, its surface size decreases about 20% compared to the surface size of the opening cross section Q3. The upper curvature radius significantly increases within the first section 70 of the flow channel 7. Within the first section 70 of the flow channel 7, the curvature radius of the upper subarea 72 can be at least in sections at least two times, at least four times, at least five times or even at least ten times the half of the channel width b. Within the upper subarea 72 of the flow channel 7, the curvature extends along an uninterrupted, continuously constant curved bow curve which forms a partial circle. Within the lower subarea 74 of the flow channel, the curvature extends along an uninterrupted, continuously constant curvature which defines a half circle section. A half-circle section can designate a cross section surface which is substantially half circular shaped. A substantial half circular shaped surface can in particular be a surface which extends along a bow curve with a bow angle of 180°±40°.

A half circular section designates, within the present application, a partial section of a circle which is smaller than a half circle section. In an exemplary embodiment, a partial circle section can describe such circle sections which extend along a bow width or a bow angle which is smaller than 120°, in particular small than 90° or even smaller than 60°.

In an exemplary embodiment, the flow channel 7 comprises transition sections 73 in which a rounded radius like transition between the upper subarea 72 and the lower subarea 74 is present, wherein the bow length of a transition section is significantly smaller than the bow length of the upper subarea 72 and the bow length of the lower subarea 74. In an exemplary embodiment, the bow length of a transition section is smaller at least by a factor of 5, or by a factor of 10. The bow length can designate the stretch of the way in millimetre from the beginning to the end of a continuously and constantly curved bow curve.

The first section 70 of the flow channel 7 extends from the inlet opening 3 to a transition point 8 where the flow channel 7 has a flow cross section surface of a smallest surface size. The smallest surface size can describe a local minimum of the surface size along the flow course S between the inlet opening 3 and the passage opening 5, or an absolute minimum of the surface size of the flow channel 7 between the inlet opening 3 and the passage opening 5. At the transition point 8, the cross-sectional surface Q77 of the flow channel 7 can comprise an upper partial section (roof) being curved flat or concave into the inside of the channel 7. Within the first section 70 of the flow channel 7, the upper subarea and the lower subarea 74 can be curved convex away from the flow middle point line S according to an exemplary embodiment.

In flow direction F behind the transition point 8, the upper subarea 82 can, within the second section 80, be flat or can substantially extend flat with a minimal deviation to a planar extension in a horizontal plane, in particular parallel to a passage plane of the passage opening 5.

Figure 4:
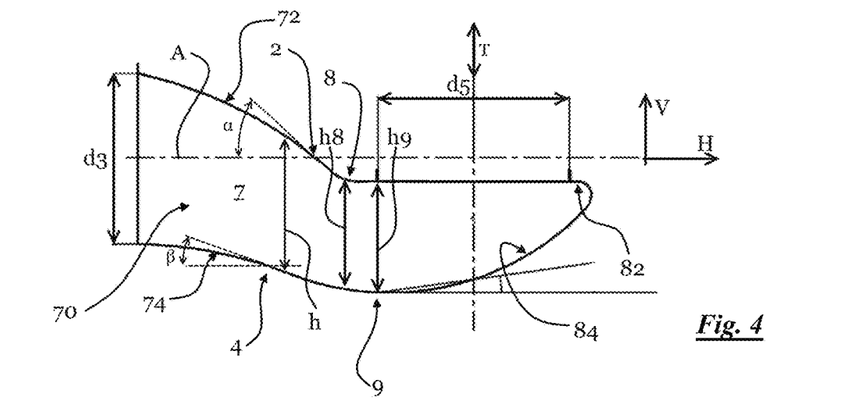
FIG. 4 illustrates a detailed cross-sectional view of the flow channel of a globe valve according an exemplary embodiment.

The lower subareas 74, 84 first decrease starting from the inlet opening 3 in vertical direction V downwards until a lowest vertex 9. The vertex 9 is located in flow direction F behind the transition point 8. The vertex 9 is located in flow direction F before the middle point line or the transversal T extending in vertical direction V through the middle point of the passage opening 5. According to an exemplary embodiment, which is shown in FIG. 4, the vertex 9 can be located particular directly in vertical direction below the (in horizontal direction H) front end 51 of the passage opening 5. Contrary to conventional globe valves in which the vertex 9 is usually located directly vertically below the midpoint line through the passage opening 5, it has been found that a displacement of the vertex 9 towards the direction of the inlet opening 3 can lead to a reduction of flow separation.

Figure 5:
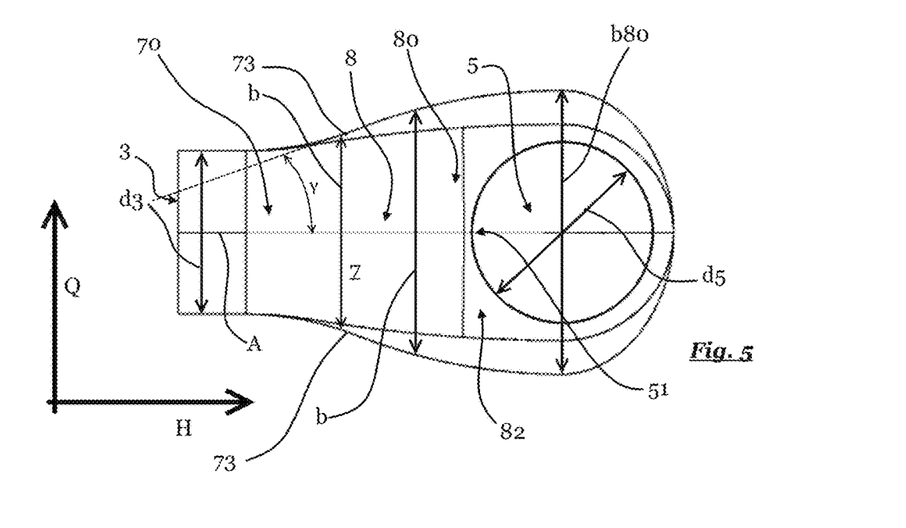
FIG. 5 illustrates cross-sectional view of the flow channel of the globe valve according to FIG. 1, in a horizontal cutting plane.

In an exemplary embodiment, the cross-sectional width of the flow channel 7 can in flow direction F at least in sections, in particular, continuously, particularly steadily, increase from the inlet opening 3 to the middle point of the passage opening 5. In an exemplary embodiment, in a short inlet section directly behind the inlet opening 3, the flow channel 7 has a constant channel width b corresponding to the inlet diameter d3. In the first section 70 and in the second section 80 of the flow channel 7, the channel width b can increase up to a maximum b80 in the area of the passage opening 5. In an exemplary embodiment, a ratio of the diameter d3 of the inlet opening relative to the maximal width b80 of the flow channel is about 0.75. The widening of the width b of the flow channel 7 can be characterised by a widening angle γ which can be about 20°±10°. The widening angle γ can describe an angle between the valve axis A and a vertical projection of the transition area 73 on a horizontal plane according to FIG. 5.

In the first section 70 of the flow channel 7 starting from the inlet opening 3, the flow channel 7 extends continuously and steadily in vertical direction V inclined downwards towards the vertex 9. In an exemplary embodiment, the upper subarea 72 of the flow channel 7 comprises a stronger upper inclination angle α compared to the lower inclination angle β at the ground respectively at the lower subarea 74 of the flow channel 7. The upper inclination angle α of the flow channel 7 can substantially be 45°±5° relative to the horizontal H. In particular, the upper inclination angle α can designate the inclination angle at a cutting point 2 between the valve axis A extending through the middle point of the opening 3 with the wall of the upper subarea 72 of the flow channel 7.

In an exemplary embodiment, the lower inclination angle β can be 20°±10° relative to the horizontal H. Alternatively, the lower inclination angle β can be 25°±5° relative to a horizontal H. In an exemplary embodiment, the lower inclination angle β can be smaller than 25°, for example 20°±3°. In particular, the lower inclination angle can be defined at a turning point 4 where an arching of the lower subarea 74 of the flow channel 7 turns from a concave arching relative to the valve axis to a convex arching relative to the valve axis. In difference to the previously used term "curvature" which describes the shape of the channel wall in a cross section orthogonal to the valve axis A respectively orthogonal to the flow middle point line S, the term "arching" describes the shape of the flow channel 7 in a cross-sectional plane according to FIG. 4 which extends in vertical direction V and in horizontal direction H. Thereby, the vertex 9 is a convex vertex of the arching with respect to the valve axis. The lower partial area 84 in the second section 80 of the flow channel 7 can be entirely arched convexly.

Figure 6:
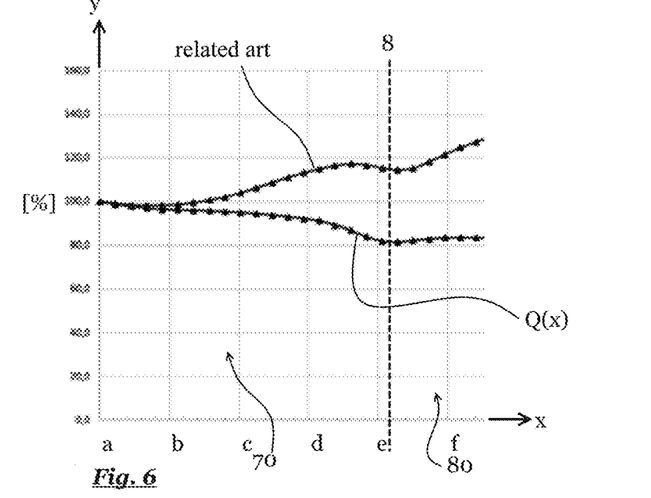
FIG. 6 illustrates a schematic diagram of the surface size of the flow cross-section of the flow channel of the globe valve according to FIG. 1 and of a conventional globe valve.

FIG. 6 shows a schematic diagram of the surface size Q(x) depending on the distance x along the flow middle point line S from the inlet opening 3 to the passage opening 5, according to an exemplary embodiment. The surface size of the flow cross section Q(x) of the inventive globe valve 1 at the inlet opening 3 defines 100%. In the first section 70 of the flow channel 7, the surface size continuously decreases up to the transition point 8. With the exemplary embodiment according to FIG. 6, the surface size Q(x) of the flow channel 7 in the second section 80 remains substantially the same or increases slightly. A minimum of the surface size of the flow channel 7 is present at the transition point 8. In the diagram according to FIG. 6, the y-axis designates the surface size in percent of the surface size of the inlet opening 3. The x-axis of the diagram according to FIG. 6 describes schematically the distance of the cross section Q from the inlet opening 3.

The features disclosed in the previous description, the Figures and the claims can, either on their own or in any combination, be of importance for the realisation of the disclosure in the different embodiments. The present disclosure is not limited to the exemplary dimensions and angles described herein, and can be other dimensions and angles as would be understood by one of ordinary skill in the art.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

REFERENCE LIST 1 globe valve
2 valve housing
3 circular shaped inlet opening
4 turning point
5 circular shaped passage opening
6 outlet opening
7 flow channel
8 transition point
9 vertex
11 valve member
13 valve rod
21 cover
24 ring-shaped valve seat
27 outlet channel
51 front end
70, 80 section
72 upper subarea
73 transition areas
74, 84 lower subarea
82 upper subarea
A valve axis
b channel width
b80 maximum
F flow direction
H horizontal direction
h channel height
Q transverse direction
Q3, Q71, Q73, Q75, Q77, Q81, Q83 opening cross section
Q(x) surface size
S flow course
T transverse movement
V ring-shaped valve seat
d3/h8, d3/h9 ratio d3 diameter
a-a, b-b, c-c, d-d, e-e, f-f, g-g cross-sectional surfaces
α upper inclination angle
β lower inclination angle
γ widening angle

The invention claimed is:

1. A globe valve for controlling a process fluid flow of a process engineering plant, comprising:
an inlet opening having a circular-shaped opening cross section defining a valve axis;
a globe valve member being:
movable in a vertical direction transversely to the valve axis, and
connectable, via a valve rod located in the vertical direction above the globe valve member, to an actuator for actuating the globe valve member;
a passage opening having a circular-shaped passage opening cross section, the globe valve member being configured to close the passage opening in a lowest actuating position in the vertical direction; and
a flow channel extending from the inlet opening to the passage opening and defining a flow cross section, wherein:
a surface size of the flow cross section decreases in a first section from the inlet opening in a flow direction to a transition point,
the flow cross section in the first section is continuously oval shaped,
the first section of the flow channel is continuously inclined downwards in the vertical direction, and
in the first section of the flow channel, in a course of the flow channel in the flow direction, a height of the flow channel in the vertical direction continuously decreases and a width of the flow channel, in a transverse direction transverse to the vertical direction and traverse to the valve axis, continuously increases.

2. The globe valve according to claim 1, wherein the first section of the flow channel comprises a lower inclination angle of 25° or less.

3. The globe valve according to claim 1, wherein in a second section of the flow channel, in the course of the flow channel in the flow direction, the width of the flow channel in the transverse direction continuously increases up to a maximum width.

4. The globe valve according to claim 3, wherein the maximum width is located at the passage opening.

5. The globe valve according to claim 3, wherein a ratio of a diameter of the inlet opening relative to the maximum width of the flow channel is at least 0.75±0.05.

6. The globe valve according to claim 1, wherein in a second section of the flow channel, in a course of the flow channel in the flow direction, a width of the flow channel in the transverse direction continuously increases up to a maximum width.

7. The globe valve according to claim 6, wherein the maximum width is located at the passage opening.

8. The globe valve according to claim 1, wherein the flow cross section in the first section undergoes a reduction of the surface size of the flow cross section relative to a surface size of the inlet opening cross section of at least 10% and/or of maximally 30%.

9. The globe valve according to claim 8, wherein the flow cross section in the first section undergoes a reduction of the surface size of the flow cross section relative to the surface size of the inlet opening cross section of 20%.

10. The globe valve according to claim 1, wherein:
a ratio of a diameter of the inlet opening relative to a vertical height of the flow channel at the transition point is at least 1.55±0.10, and/or
a ratio of the diameter of the inlet opening relative to a vertical height of the flow channel at a vertex is at least 1.55±0.10.

11. The globe valve according to claim 1, wherein the flow cross section in the first section is, at least in sections, partially circularly shaped, and wherein, in the first section in a course of the flow channel in the flow direction, a partial circular curvature of the flow cross section flattens, at least in sections, in an upper subarea.

12. The globe valve according to claim 11, wherein the flow cross section at the transition point in the upper subarea of the flow channel is concave.

13. The globe valve according claim 1, wherein the flow channel comprises a lower subarea, in the vertical direction, the lower subarea being continuously half circular shaped in a course of the flow channel in the flow direction.

14. The globe valve according to claim 1, wherein the flow channel comprises a lowest vertex in the vertical direction, the lowest vertex, in a horizontal direction, being located offset from a straight line extending, in the vertical direction through a center point of the passage opening.

15. The globe valve according to claim 14, wherein the vertex is located at a front end of the passage opening, in the horizontal direction, or between, in the horizontal direction, the front end of the passage opening and the straight line extending in the vertical direction through the center point of the passage opening.

16. A globe valve for controlling a process fluid flow of a process engineering plant, comprising:
an inlet opening having a circular-shaped opening cross section defining a valve axis;
a globe valve member being:
movable in a vertical direction transversely to the valve axis, and
connectable, via a valve rod located in the vertical direction above the globe valve member, to an actuator for actuating the globe valve member;
a passage opening having a circular-shaped passage opening cross section, the globe valve member being configured to close the passage opening in a lowest actuating position in the vertical direction; and
a flow channel extending from the inlet opening to the passage opening and defining a flow cross section, the flow channel including an upper subarea, wherein:
a surface size of the flow cross section decreases in a first section from the inlet opening in a flow direction to a transition point,
the flow cross section in the first section is continuously oval shaped,
the first section of the flow channel is continuously inclined downwards in the vertical direction,
in the vertical direction, the upper subarea having has a decreasing surface size in a course of the flow channel in the flow direction in the first section, and
the decrease of the surface size in the upper subarea of the flow channel determines an entire decrease of the surface size of the flow channel in the first section.

17. The globe valve according to claim 16, wherein the flow cross section at the transition point in the upper subarea of the flow channel is concave.

18. The globe valve according claim 16, wherein the flow channel further comprises a lower subarea, in the vertical direction, the lower subarea being continuously half circular shaped in the course of the flow channel in the flow direction.

\* \* \* \* \*